United States Patent Office 3,443,964
Patented May 13, 1969

3,443,964
PULPY TEXTURED FOOD SYSTEMS CONTAINING INHIBITED STARCHES
Nicholas G. Marotta, Milltown, Paolo C. Trubiano, Dunellen, and Kenneth S. Ronai, Ridgewood, N.J., assignors to National Starch and Chemical Corporation, New York, N.Y., a corporation of Delaware
No Drawing. Filed Apr. 21, 1966, Ser. No. 544,068
Int. Cl. A23l 1/10
U.S. Cl. 99—83                            6 Claims

ABSTRACT OF THE DISCLOSURE

Preparation of starch containing food products exhibiting a grainy, pulpy texture, by admixing the non-starch ingredients of said food product with a gelatinized, amylose containing starch product which has been inhibited by reaction with a cross-linking agent and pulverized to within a certain particle size range and thereafter heating the resulting mixture at a temperature of at least about 160° F. so as to effect the swelling of the starch particles therein.

This invention relates to a method for the preparation of starch containing food products exhibiting grainy, pulpy textures and, more particularly, to the starch systems utilized therein.

The appearance and overall consumer appeal of many processed food products is greatly enhanced when they are characterized by the presence of a pulpy texture. Such food products thus appear to retain much of their natural texture and, in so doing, exhibit a rich, highly concentrated appearance as opposed to the thick, pasty character which often results from the use of conventional starch thickeners. In addition, the presence of a pulpy texture is often accompanied by other improved properties of color and taste.

Various attempts have been made to impart this desirable pulpy texture to starch containing food products. One such method has involved the incorporation of cracker meal. However, the result of the latter technique is merely to disperse white flecks of cracker particles within the system while failing to impart either a good grain or a pulpy appearance to the resulting food product. In addition, the presence of the cracker meal detracts from the natural color of the food product. Another method, which is primarily used in baby foods, involves the incorporation of tapioca pearls therein. In this case, the extreme clarity and fragility of the pearls severely hamper the formation of a desirable pulpy texture within the food product.

It is the prime object of this invention to provide starch containing food systems with a grainy, pulpy texture. It is a further object to provide the latter characteristics via the use of starch products which exhibit an appropriate particle size and which will, more particularly, produce particles that remain intact both during and after additional processing of the resulting food product. Various other objects and advantages of this invention will become apparent to the practitioner from the following detailed description thereof.

We have now found that starch containing food products exhibiting a highly desirable grainy, pulpy texture can be readily prepared by incorporating pregelatinized, crosslinked, amylose-containing starch products into food systems, prior to the cooking and sterilization thereof. We have further found that the latter starch products are ideally suited for such usage by virtue of the fact that they are able to exhibit sufficient cold water swelling ability so that upon being cooked they will produce swollen, discrete particles having an appropriate particle size along with excellent resistance to heat, acidity, and agitation which will permit these swollen particles to remain intact during any subsequent processing operations.

As previously noted, the starch products which may be used in the novel process of this invention comprise pregelatinized, crosslinked, amylose-containing starches. The applicable starch bases which may be used in preparing these starch products may be derived from such plant sources as corn, potato, sweet potato, wheat, rice, sago, tapioca, sorghum or the like as well as the high amylose containing varieties of these sources. Also included are the conversion products derived from any of the latter bases including, for example, dextrines prepared by the hydrolytic action of acid and/or heat; oxidized starches prepared by treatment with oxidants such as sodium hypochlorite; and, fluidity or thin boiling starches prepared by enzyme conversion or by mild acid hydrolysis. In addition, the amylose fraction derived from any of the above noted starch bases may also be utilized. It is also possible to employ any substituted ether or ester derivative of these starch bases or their amylose fractions.

In order to inhibit, i.e. to crosslink, any of the latter starch bases, it is ordinarily necessary to react the starch with a crosslinking agent. These include: aliphatic dihalides such as propylene dichloride, dichloropentane, ethylene dibromide, glycerol dichlorohydrin and a dichlorobutane; ether forming epoxy halogen compounds such as epichlorohydrin and epibromohydrin; certain polyfunctional reagents such as cyanuric chloride, phosphorus oxychloride, metaphosphates and polymetaphosphates; aldehydes such as formaldehyde and formaldehyde containing resins and prepolymers; succinic anhydride; and, mixtures of adipic or citric acid with acetic anhydride. In general, these cross linking agents may be defined as compounds containing at least two functional groups which can react with at least two available hydroxy groups of the starch molecule or molecules and thus alter the cooking characteristics of the resulting starch product.

With respect to the actual preparation of these inhibited starches, we refer to a number of U.S. patents relating to various inhibition processes. These include: U.S. 2,500,950, which covers the use of dihalides and epoxy halogen compounds; U.S. 2,805,220, which covers the use of cyanuric chloride; U.S. 2,801,242, which covers the use of mixtures of meta and polymetaphosphates; U.S. 2,471,139, which covers the use of succinic anhydride as well as mixtures of adipic or citric acid with acetic anhydride; and, U.S. 2,328,537, which covers the use of phosphorous oxychloride.

Furthermore, with respect to the amount of crosslinking reagent needed for the reaction, this is determined by the granule swelling power (GSP) of the resulting crosslinked starch. Granule swelling power is a measure of the extent of granule inhibition, and may be defined as the amount of swollen, hydrated paste which is formed by the cooking, in water under specific conditions, of one gram of dry starch as divided by the weight of anhydrous starch in the swollen paste.

The GSP is determined, in practice, by dispersing one gram of starch (anhydrous weight) in enough distilled water to give a total weight of 100 grams. Normally, the starch is suspended in this water, stirred over a boiling water bath for five minutes, and then covered for the remainder of the cooking cycle. After cooking is complete, the sample is readjusted to a weight of 100 grams and transferred, quantitatively, into graduated 100 ml. centrifuge cups. The sample is then centrifuged at 2000 r.p.m. for exactly 20 minutes and the starch dispersion is removed as a clear supernate and a compacted swollen paste. The percent solids in the supernate is determined by evaporation of an aliquot. The wet weight of the swollen paste is determined directly after the decantation of the supernate and the amount of dry solids in the paste is determined by evaporation. The granule swelling power is then calculated by the formula:

$$GSP = \frac{\text{Wet weight of swollen paste}}{\text{Weight of dry starch in swollen paste}}$$

Although this procedure was used to determine the GSP values in the examples given below, it is to be noted that the technique for determining GSP need not necessarily be limited to the above described cooking conditions. Rather, the precise method of GSP determination will depend upon the nature of the inhibited starch and the manner in which it is to be used. This may involve cold water dispersion, or, it may involve cooking under pressure as in the case of high amylose starches, heat resistant starches as well as with some regular starches.

Unconverted starch will ordinarily exhibit higher granule swelling power than crosslinked, i.e. inhibited, starches. Thus, raw corn starches have a GSP of 33–35. However, in order to function effectively as texture producing starches, these mildly inhibited starches should have a GSP value in the range of from about 8 to 32 since within this range they appear to provide food products with an optimum degree of pulpy texture. Therefore, the quantity of crosslinking reagent to be used in the inhibition process may be defined as that amount required to obtain a product having a GSP of between 8 and 32. As these reagents all differ in their reactivity with starch, the optimum proportions will be different for each reagent. It should be noted, however, that only inhibited high amylose-containing starches and inhibited amylose provide satisfactory products displaying a pulpy texture at the lower GSP values, i.e. 8 to 10; whereas the other applicable inhibited starch bases provide optimum pulpy textured products when they have a GSP value in excess of about 10.

Excessive inhibition, which lowers the GSP values appreciably under 8, results in starch products which are incapable of providing stable pulpy textures, since the particles of such starches will not swell sufficiently during subsequent processing operations.

The method ordinarily used for producing cold water swelling starch products involves gelatinizing the starch, i.e. swelling and ultimately bursting the starch granules, and thereby enabling the resulting starch product to swell in water and eventually to produce discrete bulky particles. The gelatinization process preferably used, for purposes of this invention, is drum drying. In the latter procedure, an aqueous slurry of the crosslinked, amylose-containing starch is passed over heated rollers which raise the temperature of the slurry above the gelatinization point of the starch present therein while also evaporating the water therefrom so as to ultimately yield dry, solid particles of pregelatinized starch.

The drum drying conditions, e.g. temperature and drum speeds, under which the starch product is gelatinized and dried will, of course, vary according to the particular formulation, the degree of crosslinking therein, the degree and density of the desired granule swelling and the ultimate end-use application. In addition, it should be noted that the above described procedure may be varied by pre-cooking the starch product, as by the use of a boiling water bath, a swept-surface heat exchanger, or a jet cooker apparatus, prior to drum drying. The use of any of the latter procedures thus enables the practitioner to utilize lower drum temperatures and rotating speeds as well as to reduce the overall time required for the drum drying operation.

The starch products resulting from the drum drying process are in the form of thin, solid sheets which are then pulverized in order to provide particles of which no more than about 25%, by weight, will be retained on a #12 U.S. Standard Sieve, while no more than about 60%, by weight, will pass through a #100 U.S. Standard Sieve. Thus, the use of starch products which contain more than about 25%, by weight, of +12 material, i.e. particles which will be retained on a #12 mesh screen, will result in the formation of undesirably thick, unnatural textures in the final food products as opposed to imparting the desirable optimum grain-like pulpy texture. On the other hand, starch products which contain more than about 60%, by weight, of −100 material, i.e. particles which will pass through a #100 mesh screen, cannot provide the particles whose large size is the basis of the resulting pulpy textured effect.

Other mechanical means of accomplishing the latter gelatinization step, e.g. spray drying, flash drying and extrusion, etc., may also be utilized if so desired by the practitioner. It should be noted, however, that the drum drying procedure is most economical and efficient for purposes of this invention.

The resulting crosslinked, pregelatinized, amylose-containing starch products should now exhibit the properties which are required in order to enable them to provide the grainy, pulpy texture desired in the food products resulting from the novel process of this invention. Thus, being gelatinized, they are able to provide sufficient cold water swelling ability to produce discrete bulky particles during atmospheric cooking. In addition, they exhibit a proper mesh size and are sufficiently inhibited to permit their individual particles to withstand the heat, acidity, and agitation that may be encountered in subsequent food processing procedures.

Among the food products which can profit from the presence of the crosslinked, pregelatinized starch products produced according to the above procedure are: soups, tomato sauce, meat sauces, gravies, baby foods, puddings, cereals, fruit sauces such as apple sauce, fruit drinks such as pineapple drink, dry powdered mixes which may be reconstituted with water into fruit drinks, soups, etc., confections such as textured orange gum drops, and grainy textured baked goods such as cookies, crackers, pastries, and cakes. Thus, in tomato sauce, for example, the presence of such starch products enables the resulting sauce to exhibit the rich, natural texture of the fresh, raw tomato.

In order to incorporate these starches into a food product, they may merely be put into the form of an aqueous slurry which should contain at least about 10% of water, as based on the total weight of components in the final food product. As an optional component, these slurries may also contain a conventional starch thickener, such as inhibited tapioca or a waxy maize starch; the resulting slurry, either with or without the conventional thickener, thereupon being added to the various non-starch, food base ingredients. It should be noted that when reference is made to "water" or "moisture" in the process of this invention, we contemplate the use of water either in its pure state or as the liquid vehicle of a fruit juice or milk, etc. Furthermore, when reference is made to the "non-starch" ingredients of our products, we contemplate such ingredients as fruits, meats, fish, seafood, vegetables, flours, cereals, spices, flavors, sweeteners, colorings, and preservatives, etc.

In either instance, the resulting mixture is then heated at a temperature of at least about 160° F., thereby causing the crosslinked, pregelatinized starch product to swell and thus form the desired discrete bulky particles. In all cases, the starch containing food products resulting from the process of our invention will have a moisture content of at least about 5%, by weight.

As previously mentioned, the resulting swollen particles of the crosslinked, pregelatinized starch products are not adversely affected by any of the food processing, and particularly the sterilization, techniques to which the food products containing the latter starches will subsequently be subjected when they are to be packaged in sealed containers such as tin cans or glass jars. Such sterilization techniques include stationary cooking and retorting, i.e. pressure cooking at a combination of temperatures and pressures in excess of about 212° F. and one atmosphere; the latter method being of particular significance in the food industry. In addition, food systems having pH levels below about 4.5 are frequently sterilized by being cooked at atmospheric pressure, at temperatures less than about 100° C. The latter procedure is ordinarily used in the sterilization of fruit containing food products.

The amount of grain introduced into any particular food product may be left to the discretion of the practitioner. Such preference will, of course, depend on the natural characteristics of the basic food constituent as well as on the nature of the food formulation being prepared. The amount of grain present in the resulting food product may be determined by initially controlling the addition level of the crosslinked, pregelatinized starch products as well as the average particle size of the latter starch products. Thus, for example, typical values for tomato sauces would include a concentration of from about 1 to 4%, by weight, of a crosslinked, pregelatinized starch of which about 95%, by weight, of the particles are capable of passing through a #12 U.S. Standard Sieve but about 80%, by weight, of which will be retained on a #100 U.S. Standard Sieve.

Needless to say, the desired grainy texture will not be adversely affected by the inclusion in the food products of this invention of such additives as sweetening, coloring and flavoring agents.

In the following examples, which further illustrate the embodiment of this invention, all parts given are by weight unless otherwise specified.

EXAMPLE I

This example illustrates the preparation of a food system typical of the products of this invention which, in this case, was a tomato sauce characterized by its permanent grainly, pulpy texture.

The following ingredients were utilized in the preparation of the tomato sauce formulation of this example.

|  | Parts |
| --- | --- |
| Tomato paste | 177.0 |
| Corn starch crosslinked, according to the method set forth in U.S. Patent No. 2,500,950, with 0.05%, by weight, of epichlorohydrin so as to obtain a product having a GSP of 17.0; which was thereupon pregelatinized by drum drying for a period of 30 minutes at a drum temperature of 300° F., and pulverized so as to obtain a product containing 5%, by weight, of particles retained on a #12 mesh screen and 20%, by weight, of particles passing through a #100 mesh screen | 14.5 |
| Sugar | 14.5 |
| Water | 305.2 |

The above listed starch product was dry blended with the sugar and then dispersed in 100 parts of water. Under agitation, the tomato paste was then added to the remaining amount of water so as to achieve a mixture having a uniform consistency. Both slurries were then admixed and the resulting blend was thereupon cooked for five minutes at a temperature of 190° F. The resulting hot sauce was then canned, at elevated temperatures, and the sealed cans retorted, i.e. pressure cooked, for 25 minutes at a temperature of 245° F. and a pressure of 15 p.s.i.

The resulting tomato sauce was found to exhibit an excellent, natural pulp-like texture as well as a natural red color. There was no evidence of particle deterioration as a result of the retort heating procedure. In addition, neither stirring nor agitation disrupted the conformation of the swollen particles.

EXAMPLE II

This example illustrates the necessity for utilizing only the particular starch products previously designated for use in the process of this invention in order to achieve the desired grainly, pulpy texture in the final food product.

The identical procedure utilized in Example I, hereinabove, was employed to prepare the tomato sauce formulation of this example with the exception that the crosslinked, drum dried starch was eliminated and 14.5 parts of a waxy maize starch inhibited by treatment with a combination of adipic acid and acetic anhydride substituted therefor.

The resulting tomato sauce did not exhibit the grainy, pulpy texture evident in the tomato sauce prepared by means of the process of this invention, as described in Example I. In contrast, it exhibited a smooth, heavy, pasty texture.

It thus becomes obvious that in order to prepare a retorted food product with a stable, grainy texture, it is essential that an amylose-containing, crosslinked, pregelatinized starch product, as specified in this invention, be present therein.

EXAMPLE III

This example illustrates the correlation between the granule swelling power of inhibited starch products and their performance as texture imparting additives in the food products of this invention. In particular, it illustrates the necessity for inhibiting the starch bases to within the required limits in order to obtain products whose pulpy texture exhibits maximum resistance to disintegration during various subsequent processing operations.

In order to determine the stability of the grain effect imparted by various starches, the following test procedure was utilized:

Part A.—A dry blend of 7.5 parts of the specified inhibited starch and 7.5 parts of sugar was admixed with 200 parts of distilled water. The resulting slurry was then cooked to a temperature of 190° F., immediately diluted with 200 parts of water and poured over a tared #20 U.S. Standard Sieve. The material retained on the screen was then thoroughly washed, dried and weighed.

Part B.—Thereupon, a second portion of the above prepared cooked slurry was poured into a No. 2 can, which was sealed and retorted, i.e. pressure cooked, at a temperature of 245° F. and a pressure of 15 p.s.i. for a period of 30 minutes. The can was then cooled for thirty minutes and its contents diluted with 200 parts of water. The resulting slurry was poured over a tared #20 U.S. Standard Sieve; the material retained thereon then being washed, dried and weighed.

The presence, as determined by the method of Part A, of +20 particles, i.e. particles which were retained on the #20 mesh screen, and the subsequent retention of a predominant portion of these particles in their initial bulky form, as shown by the results of the procedure of Part B, is indicative of the fact that these inhibited starch products are capable of providing satisfactory pulpy textured food products which will not be deleteriously affected by retorting conditions.

The following table lists the various amylose containing, pregelatinized, inhibited starches which were tested and provides information relating to the pulpy textured products resulting from their use. It should be noted that these inhibited starches were drum dried and inhibited by means of the procedure referred to in the description of the starch product utilized in Example I.

| Starch | GSP | Parts of +20 material in Part A | Parts of +20 material in Part B |
|---|---|---|---|
| Corn starch crosslinked with 0.05% epichlorohydrin | 17.0 | 3.3 | 2.5 |
| Corn starch crosslinked with 0.30% epichlorohydrin | 7.9 | 0.2 | Trace |
| Wheat starch crosslinked with 0.05% epichlorohydrin | 17.7 | 2.9 | 2.0 |
| Wheat starch crosslinked with 0.50% epichlorohydrin | 6.9 | 0.2 | Trace |

The above data clearly indicates the excellent pulpy textured products resulting from the use of the specified amylose containing, pregelatinized, crosslinked starches. It also illustrates the necessity for carefully controlling the concentration of the crosslinking agent so as to be able to maintain the GSP within the range necessary for attaining optimum results.

EXAMPLE IV

This example illustrates the use of a number of different crosslinked starches in the preparation of the tomato sauce product of Example I.

Thus, in several repetitions of the procedure of Example I, a number of different crosslinked, pregelatinized starches were substituted for the epichlorohydrin inhibited, drum dried corn starch which was used in the preparation of the tomato sauce of Example I.

The starches employed were:

(1) A corn starch which had been mildly inhibited, according to the method of Example II of U.S. Patent No. 2,500,950, with 0.01%, by weight, of epichlorohydrin so as to obtain a product having a GSP of 26.4.

(2) A corn starch which had been mildly inhibited, according to the method of Example II of U.S. Patent No. 2,500,950, with 0.15%, by weight, of epichlorohydrin so as to obtain a product having a GSP of 12.1.

(3) A wheat starch which had been mildly inhibited, according to the method of Example II of U.S. Patent No. 2,500,950, with 0.01%, by weight, of epichlorohydrin so as to obtain a product having a GSP of 25.3.

(4) A wheat starch which had been mildly inhibited, according to the method of Example II of U.S. Patent No. 2,500,950, with 0.15%, by weight, of epichlorohydrin so as to obtain a product having a GSP of 11.2.

(5) A corn starch acetylated with 2%, by weight, of acetic anhydride which had been mildly inhibited, according to the method of Example II of U.S. Patent No. 2,500,950, with 0.15%, by weight, of epichlorohydrin so as to obtain a product having a GSP of 13.5.

(6) A high amylose corn starch containing 70%, by weight, amylose which had been mildly inhibited, according to the method of Example II of U.S. Patent No. 2,500,950, with 0.05%, by weight, of epichlorohydrin so as to obtain a product having a GSP of 8.5.

(7) A corn starch which had been mildly inhibited, according to the method of Example 13 of U.S. Patent No. 2,461,139, with 0.70%, by weight, of a 9:1 mixture of acetic anhydride and adipic acid so as to obtain a product having a GSP of 27.0.

(8) A corn starch which had been mildly inhibited, according to the method outlined in column 1, line 58 through column 2, line 30 of U.S. Patent No. 2,328,537, with 0.2%, by weight, of phosphorous oxychloride so as to obtain a GSP of 10.5.

It should be noted that all of the above described starches were then drum dried and pulverized to a mesh size such that no more than 25%, by weight, of the particles were retained on a #12 U.S. Standard Sieve while no more than 60%, by weight, passed through a #100 U.S. Standard Sieve.

The tomato sauces which were produced when using each of the above described starches were of excellent quality and fully comparable to the tomato sauce described in Example I as regards the appearance and stability of the pulpy texture.

EXAMPLE V

This example illustrates the preparation of additional food products of this invention characterized by their excellent pulpy textures.

A. Tomato sauce containing thickening agent

The following formulation was prepared according to the procedure described in Example I, hereinabove.

| | Parts |
|---|---|
| Tomato paste | 177.0 |
| Water | 305.2 |
| Pregelatinized, crosslinked corn starch (as described in Example I) | 10.9 |
| Modified waxy maize starch (thickening agent—as described in Example II) | 3.6 |
| Sugar | 14.5 |

The resulting tomato sauce exhibited an excellent pulp-like texture.

B. Apple sauce

The following ingredients were used in this formulation:

| | Parts |
|---|---|
| Apple juice | 100.0 |
| Lemon juice | 0.3 |
| Pregelatinized, crosslinked corn starch (as described in Example I) | 7.5 |
| Sugar | 25.0 |

The starch and sugar were blended and then admixed with the juice. The resulting mix was heated to 190° F. for a period of 5 minutes and then canned and cooled. Sterilization by retorting was not required, in this instance, since sterilization had been accomplished by the combination of moderate cooking and the low pH level of the food system.

The resulting apple sauce exhibited a unique pulpy texture resembling the natural fibrous fruit.

C. Dessert pudding

A dry blend of 10 parts of pregelatinized, crosslinked corn starch (as described in Example I) and 25 parts of sugar was admixed with 100 parts of whole milk. This mixture was heated to 190° F. for a period of 5 minutes. When cooled, the resulting pasty material provided an excellent pulpy textured pudding product.

D. Baby cereal

The following ingredients were utilized in this formulation:

| | Parts |
|---|---|
| Pitted prunes | 10 |
| Pregelatinized, crosslinked corn starch (as described in Example I) | 7 |
| Sugar | 10 |
| Salt | trace |
| Whole milk | 100 |

In this preparation, the solid ingredients were blended and then admixed with the milk. The resulting mix was then heated to 190° F. for a period of 5 minutes. The cereal product resulting from this procedure exhibited an appealing pulpy texture.

Summarizing, it is seen that this invention provides for the preparation of food products characterized by a highly-desirable grainy, pulpy texture.

Variations may, of course, be made in proportions, procedures, and materials without departing from the scope of this invention which is defined by the following claims.

We claim:

1. A process for the preparation of a starch containing food product having a novel grainy pulpy texture, said process comprising the steps of (1) admixing all of the individual, non-starch ingredients of said food product with water and a gelatinized, amylose-containing starch product which has been inhibited by reaction with a polyfunctional crosslinking agent so that it has a granule swelling power in the order of from about 8 to 32, said starch product being in pulverized form such that no more than about 25%, by weight, of its particles will be retained on a #12 mesh U.S. Standard Sieve and no more than about 60%, by weight, of its particles will pass through a #100 mesh U.S. Standard Sieve, the mixture thus prepared containing at least about 10%, by weight, of water; and, (2) thereupon heating the resulting mixture at a temperature of at least about 160° F. so as to effect the swelling of the starch particles therein.

2. The process of claim 1, wherein said polyfunctional crosslinking agent is selected from the group consisting of aliphatic dihalides, ether forming epoxy halogen compounds, cyanuric chloride, phosphorus oxychloride, metaphosphates, polymetaphosphates, formaldehyde, formaldehyde containing resins and prepolymers, succinic anhydride, mixtures of adipic acid and acetic anhydride, and mixtures of citric acid and acetic anhydride.

3. The process of claim 1, in which the heated resulting mixture of step (2) is rendered sterile by subjecting the same to a temperature of at least about 212° F. and a pressure of at least one atmosphere.

4. The process of claim 1, in which the said resulting mixture has a maximum pH at a level of 4.5 and is heated to a temperature of at least about 160° F. so as to effect the swelling of the starch particles therein and the sterilization thereof.

5. The process of claim 4, wherein said polyfunctional crosslinking agent is selected from the group consisting of aliphatic dihalides, ether forming epoxy halogen compounds, cyanuric chloride, phosphorus oxychloride, metaphosphates, polymetaphosphates, formaldehyde, formaldehyde containing resins and prepolymers, succinic anhydride, mixtures of adipic acid and acetic anhydride, and mixtures of citric acid and acetic anhydride.

6. The food product resulting from the process of claim 1.

References Cited

UNITED STATES PATENTS

| | | | |
|---|---|---|---|
| 2,500,950 | 3/1950 | Konigsberg | 260—233.3 |
| 2,508,533 | 5/1950 | Olsen | 99—139 XR |
| 2,548,263 | 4/1951 | Hofman | 99—139 XR |
| 2,733,238 | 1/1956 | Kerr | 99—139 XR |
| 2,977,356 | 3/1961 | Cummerford et al. | 99—139 XR |

RAYMOND N. JONES, *Primary Examiner.*

J. M. HUNTER, *Assistant Examiner.*

U.S. Cl. X.R.

99—28, 92, 101, 124, 134, 139, 144